United States Patent
Kachnik

[15] 3,665,967
[45] May 30, 1972

[54] SUPERCHARGE HOSE

[72] Inventor: Joseph E. Kachnik, Fort Worth, Tex.

[73] Assignee: The Western Company of North America, Fort Worth, Tex.

[22] Filed: Jan. 16, 1970

[21] Appl. No.: 3,352

[52] U.S. Cl..............................138/137, 138/177, 138/178
[51] Int. Cl.......................................................F16l 11.00
[58] Field of Search.................138/26, 27, 28, 30, 118–139, 138/178, 177

[56] References Cited

UNITED STATES PATENTS

| 2,495,693 | 1/1950 | Byrd et al.............................138/26 X |
| 2,852,033 | 9/1958 | Orser....................................138/30 X |
| 3,095,120 | 6/1963 | Steiner et al..........................138/30 X |

Primary Examiner—Houston S. Bell, Jr.
Attorney—Richards, Harris & Hubbard

[57] ABSTRACT

A conduit is provided for use in fluid-conducting systems which are subjected to pressure surges and includes an inner conduit for carrying fluid which is surrounded by a body of resilient material adapted to absorb undulations of the inner conduit in response to pressure surges of the fluid. In one embodiment the inner conduit is an expandable conduit and the resilient body is contained within a reinforcing member. In this embodiment, the inner conduit expands in response to pressure surges and thereby functions as an accumulator, so as to prevent damage to equipment in the system, such as pressure gauges, piping, and conduits, or for example, to even out the flow discharge from a positive displacement pump for the fluid.

4 Claims, 5 Drawing Figures

Patented May 30, 1972

INVENTOR
JOSEPH E. KACHNIK

Richards, Harris & Hubbard
ATTORNEY

Patented May 30, 1972

INVENTOR.
JOSEPH E. KACHNIK

Richards, Harris & Hubbard
ATTORNEY

SUPERCHARGE HOSE

This invention relates to piping and conduits. In another aspect, this invention relates to a novel means of preventing damage to conduits and components of a fluid flow system which results from pressure surges of the fluid carried by the system. In still another aspect, this invention relates to a novel conduit.

The design of any hydraulic system poses the conventional problem of compensating for the destructive action of the fluid upon the equipment of the system. For example, hydraulic shock upon equipment can occur whenever a fluid which is flowing through a system experiences a sudden change in flow rate, pressure, or direction. Such sudden changes are transmitted to the fluid as pressure pulses, which can burst pipes, blow out seals, jam closely fitted parts, and damage system components such as pressure gauges, flow meters, and the like. In addition, when any system contains flexible hoses, such as for example fracturing, and acidizing systems utilized in the treatment of oil wells, any pressure pulse or vibration subjected to the fluid in the system will be transmitted into the flexible hoses, and cause them to react in an undulating manner. When these hoses are resting upon hard and/or abrasive surfaces such as other piping, or sand, or rock, the undulations will result in undue wear on the exterior of the hoses, and ultimately failure of the hoses. This is not only very expensive and time-consuming in that the whole operation must be shut down, but if the hoses are carrying flammable fluids such as oil, their breakage will cause a safety hazard to the surrounding area. The bursting of these hoses caused by undue wear and tear many times results in disastrous fires and explosions when the flammable fluid in the hose comes in contact with hot pump or engine parts, for example.

Therefore, one object of this invention is to provide a novel pressure absorbing conduit for use in hydraulic systems.

Another object of this invention is to provide a novel flexible conduit for use in a fluid system which is subjected to pressure surges and/or mechanical vibrations, which conduit is highly resistant to abrasive damage caused by such surges and/or vibrations.

A further object of this invention is to provide a novel conduit for fluid systems which will compensate for pressure surges within the system, even out flow within the system and prevent damage to equipment within the system.

According to one embodiment of this invention, a novel pressure absorbing conduit is provided for a hydraulic system which comprises an inner flexible conduit for carrying fluids within the system, and an annular resilient member positioned around said inner flexible conduit for absorbing undulations of the flexible conduit in response to any pressure surge or the like from the fluid in the system. Preferably the resilient body is contained within an abrasion resistant cover which will resist normal wear and tear to which the conduit will be subjected.

According to another embodiment of this invention, an improved conduit is provided for compensating for pressure surges and the like within the system which comprises an inner expandable conduit, which is contained within an outer nonexpandable conduit and having an annular resilient body enclosed therebetween.

This invention can be more easily understood from a study of the drawings in which.

Figure 1:
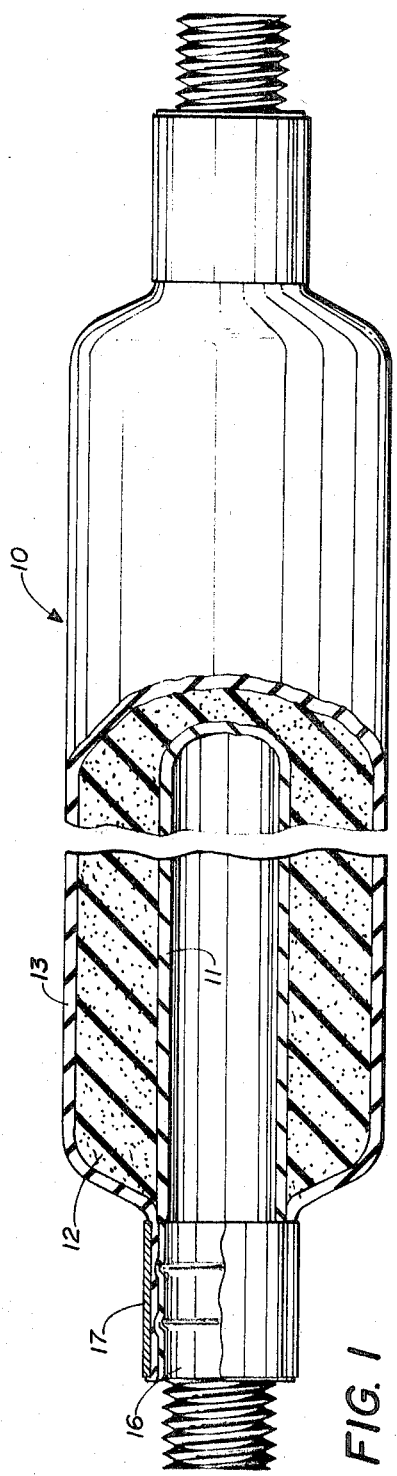
FIG. 1 is a view partially in section of a flexible hose of this invention.

Now referring to FIG. 1, a preferred hose of this invention is illustrated. As shown, hose 10 comprises an inner flexible conduit 11 which is surrounded by an annular body of resilient cushion material 12 which in turn is surrounded by a thin tough outer tube 13.

Inner flexible tube 11 is made of any high strength flexible pressure conduit material known in the art, and the specific materials can be varied as desired. For example, inner flexible conduit 11 can be a rubber hose containing either woven or nonwoven reinforcing fibers therein to provide strength to prevent bursting from internal pressure fluctuations and the like. Examples of suitable rubbers include polyurethane, polyisoprene, polybutadiene, polyisobutene, SBR, ABS rubber, chlorosulfonated polyethylene, and the like. Any other suitable construction material can be utilized. It is only necessary that inner flexible tube 11 be of sufficient strength to withstand the pumping and surge pressures of the particular system within which it is to operate.

Resilient cushion body 12 can be made of any suitable material such as foam rubber, e.g., polyurethane foam; a resilient compressible fiber body; a gas bladder; and the like. In applications, such as in use in oil field operations, it is preferred that resilient cushion body 12 be made of a closed cell foam, such as a closed cell polyurethane foam. Such material will not only serve in a shock absorbing capacity, but will also prevent permeation of flammable fluids therethrough if inner flexible conduit 11 were to burst or leak, and serves as a thermal insulation. This material can be preformed either as an annular body or as a strip or strips for example, and then fastened in place around inner flexible conduit 11, or foamed in place in the annulus between inner flexible conduit 11 and outer tube 13 during the manufacture of hose 10. It is generally preferred that resilient cushion body 12 be bonded to the outer periphery of inner flexible conduit 12 and the inner periphery of outer tube 13 by suitable methods such as vulcanizing and cementing.

Outer tube 13 is preferably made of an abrasive resistant material, such as isoprene or natural rubber, for example, black pure gum rubber, which will resist the normal wear and tear to which a flexible hose is subjected.

As shown in FIG. 1, conventional connections can be used with hose 10 to form a complete hose assembly. As illustrated, the end of hose 10 is necked down so that inner flexible conduit 11 is intimately contacted with outer tube 13 and the end fittings which comprise inner serrated tube 16 and outer sleeve 17 are applied thereto.

In operation, hose 10 can be utilized in any high pressure system, such as for example, as a discharge conduit from a positive displacement pump to down-well tubing in a subterranean well fracturing or acidizing operation. In such an operation, hose 10 will be subjected to tremendous pressure surges and mechanical vibrations. Alternatively, the hose can be utilized on the suction side of a positive displacement pump and again will be subjected to extreme vibrations and pressure surges and the like. Conventional hoses utilized in this general type operation generally comprise heavy steel reinforced rubber hoses (reinforced with either a steel mesh or a steel coil comprising several layers of material). These hoses undulate at an extremely high frequency in response to the pressure surges and vibrations imparted thereto by positive displacement pumps and diesel engines. The life of these conventional hoses is relatively short because the vibrations and undulations of the hose are transmitted directly to stationary objects such as piping, equipment, rocks, and sand, and thereby results in extreme wear on the outer surfaces thereof, until failure. Consequently, most of these hoses are covered with canvas shields to prevent material, such as flammable material transported thereby from spraying onto hot parts, such as diesel engine exhausts.

Figure 2:
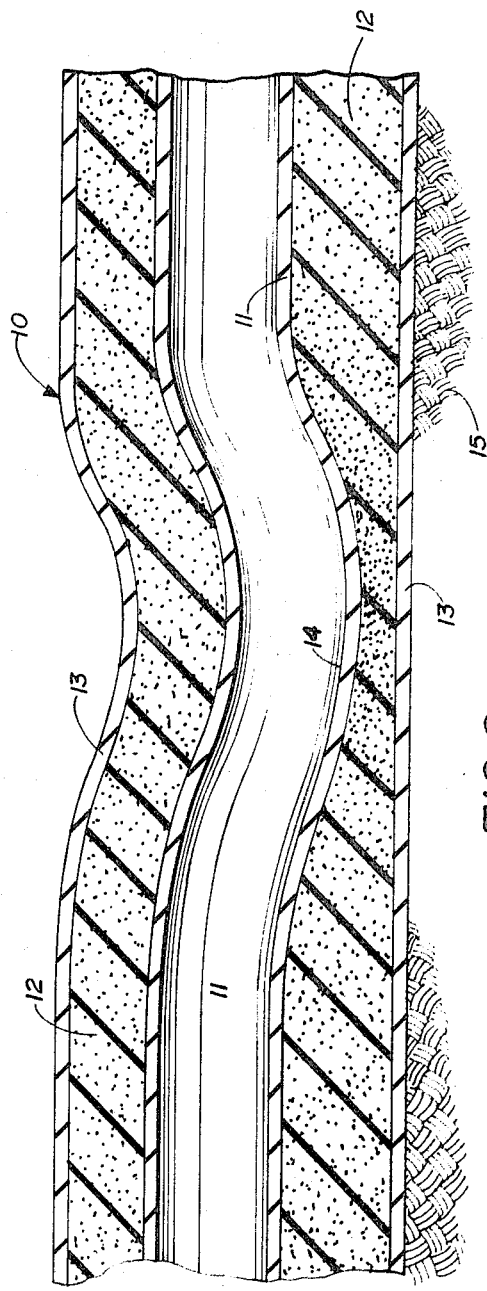
FIG. 2 is a sectional view of the hose in FIG. 1 illustrating the absorbing action thereof.

The shock absorbing action of hose 10 is illustrated in FIG. 2, which is a schematic view illustrating the internal configuration of hose 10 when subjected to a pressure impulse. As shown, when a pressure surge or impulse is transmitted to the fluid flowing through hose 10, the hydraulic pressure force is transmitted to the sides of inner flexible conduit 11. Inner flexible conduit 11 will in turn undulate in response to the force.

This undulation is indicated by depression 14 in FIG. 2. As illustrated, cushion 12 will become impinged and compress between an immovable surface 15 and depression 14. Thus, the resiliency of cushion 12 acts to absorb the undulations of inner flexible conduit 11 and prevent transmission of this rapid pounding movement to the external portion of the hose. This action will in turn prevent constant or cyclic movement of the external portion of the hose (outer tube 13) and the consequent abrasive wear against immovable surface 15.

The number of pressure surges and/or vibrations which result in undulating or depressions 14 of inner flexible conduit 11 are tremendous during most operations, such as for example, well treating operations. For example, in a conventional fracturing operation it is typical to connect 15 to 20 positive displacement pumps which operate at about 400 rpm into the same pressure line. Thus, a large number of pressure surges per minute will result from this operation and be transmitted to every part of the pressure system, including the flexible hose, which may be used as an intake hose on the suction side of the pump from a reservoir to the pump or an output hose from the discharge side of the pump to the wellbore. The hose of this invention as illustrated in FIG. 1, can be utilized in such operation, and even though subjected to the same vibrations as conventional hoses will have an effective life several times longer. A suitable hose 10 of this invention which can be used as an output hose from the positive displacement pumps in the above-described operation includes a hose 15 feet in length wherein outer tube 13 is a 4 inch I.D. × ¼ inch fiber reinforced "Hypalon" rubber (chlorosulfonated polyethylene) tube, inner flexible conduit 12 is a 2 inch O.D. × ⅜ inch fiber reinforced neoprene tube, and resilient cushion body 12 is a closed cell polyurethane foam intimately bonded to conduit 12 and tube 13.

Figure 3:
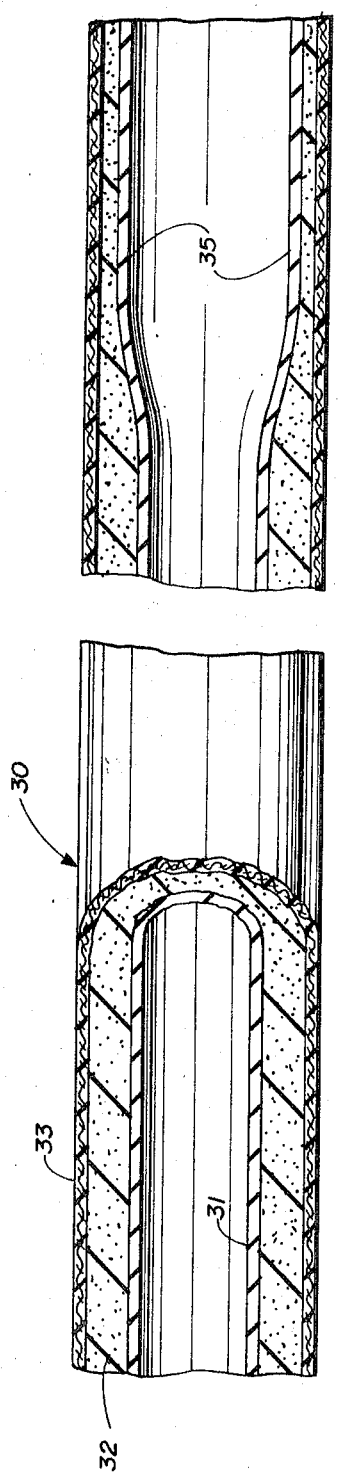
FIG. 3 is a view partially in section of another embodiment of this invention.

Now referring to FIG. 3, another embodiment of this invention is illustrated. Conduit 30 comprises an inner expandable tube 31 surrounded by a resilient cushion body 32, which is contained within outer tube 33. Inner expandable conduit 31 may be made of any suitable elastomer and in effect will expand in response to pressure surges applied to the fluid passing therethrough. Any suitable elastomer such as natural or synthetic rubber can be utilized as construction material for inner expandable conduit 31. Suitable synthetic rubbers include polybutadiene, polyisoprene, polybutene, and the like. Resilient cushion body 32 can comprise the same construction materials utilized as resilient cushion material 12 for hose 10. Outer tube 33 is a pressure-resistant high strength material. For example, it can be made of the same construction material as an inner flexible conduit 11 of hose 10 having an outer coating of an abrasive resistant material, such as natural rubber thereon, or it can comprise a non-flexible material, e.g., a tubular metal body such as steel.

In operation, conduit 30 is advantageously utilized in any system which is subjected to constant variations in pressure, flow rate, or direction of fluid flow wherein there is a rapid conversion of kinetic energy and to pressure energy flowing through the system. Such changes can result from rapid valve closure or valve opening in a system, "pump ripple" such as described above in relation to the positive displacement pumps, or other causes such as power failure or pump failure. Conditions such as these induce hydraulic shock waves into the fluid pumped by the system, which waves are transmitted to the equipment of the system and many times result in damage thereto.

However, when conduit 30 is utilized in the system it acts to accumulate or absorb these undesirable pressure surges as illustrated in FIG. 3. As shown, an increase in pressure energy within the system which can be caused by any of the aforementioned reasons, or others, will result in a tremendous energy buildup in the system. This energy buildup is transmitted through the hydraulic system in the form of a pressure pulse and creates great strain on the piping and other equipment. For example, when conduit 30 is utilized in a system and pressure surges are created therein, such as by a valve closure or the like, and are transmitted to conduit 30, inner expandable tube 31 will expand in response to the pressure impulse as illustrated at points 35. This expansion of inner expandable tube 31 is absorbed by resilient cushion body 32 before it is transmitted to outer tube 33. Thus, no fracturing strain is transmitted to the pressure-resistant structural component (tube 33) of the system. This action not only prevents undue strain and possible breakage of the conduit through which the fluid is passed, but also will function to accumulate the pressure surges within conduit 30 so that the output from conduit 30 is levelled out and hence made uniform and constant.

Figure 4:
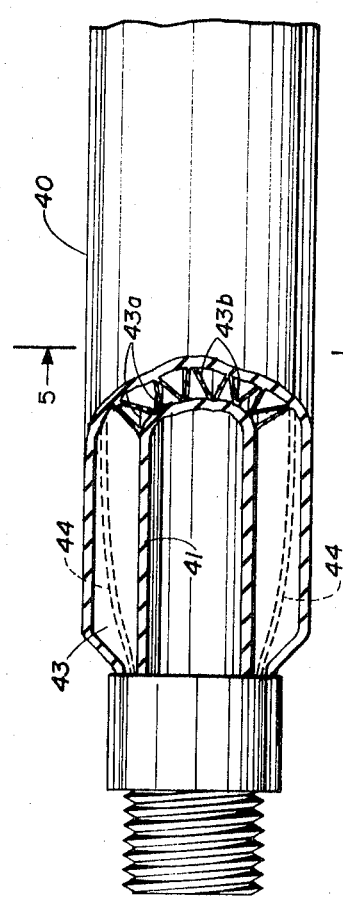
FIG. 4 is a view partially in section of another embodiment of this invention.
Figure 5:
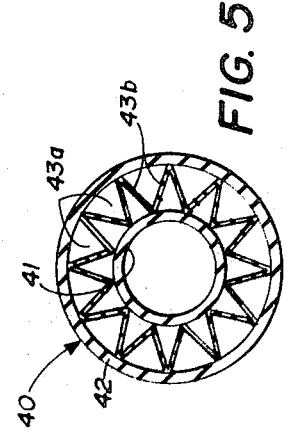
FIG. 5 is a cross sectional view along lines 5—5 of the hose of FIG. 4.

Now referring to FIG. 4 another embodiment of this invention is illustrated which is a general type conduit as illustrated in FIG. 3. As shown, conduit 40 comprises an inner expandable tube 41 spaced from outer tube 42 by a gas cushion chamber 43. Inner expandable tube 41 and outer tube 42 can be made of the same material as inner expandable tube 31 and outer tube 33, respectively, of conduit 30 of FIG. 3. Gas cushion chamber 43 can be filled with a suitable gas such as air, but preferably a relatively inert gas such as nitrogen or helium. In addition, gas cushion chamber 43 can comprise either a series of separate or communicating pressure chambers 43a separated by web members 43b, as illustrated in FIG. 4 and FIG. 5 (a cross sectional view taken along lines 5—5 of FIG. 4). Thus, conduit 40 will function in the same manner as conduit 30 in that inner expandable tube 41 will expand and be displaced as illustrated by the broken lines 44 of FIG. 4 in response to pressure surges within the fluid which is pumped therethrough. The gaseous pressure maintained within gas cushion chamber 43 can be varied according to the particular situation. If desired, chamber 43 can be fitted with valve stem means and pumped to the desired gaseous pressure so that the output of conduit 40 can be regulated in any particular hydraulic system to yield the desired constant flow therefrom.

The use of conduits of this invention as illustrated in FIGS. 3 and 4 will not only function to absorb unwanted pressure surges within a system, but can be utilized to level out and make constant the flow from a positive displacement type pump. In addition, the other components in the system, such as pressure gauges, flow meters and the like will no longer need to have damping equipment associated therewith. Thus, such components can be made smaller to withstand less strain which would be subjected thereto by possible peak pressures in a system, because these pressures will be compensated for by conduits 30 or 40 of this invention.

In addition, the accumulator type conduits as illustrated in FIGS. 3 and 4 of this invention will also function as pressure absorbers in the same manner as conduit of the first embodiment of this invention, as illustrated in FIGS. 1 and 2 in that any undulations from the inner conduit will be absorbed by the resilient cushion interposed therearound and between the outer conduit. Thus, the outer conduit will be subjected to less abrasion resistance due to constant vibratory movement against an immovable object.

It is quite apparent that the pressure conduits of this invention can be utilized in many operations, for example in any hydraulic system for transmitting power, such as a hydraulic brake system for an automobile or airplane, as well as systems wherein a fluid is transmitted, such as in fracturing or acidizing operations for oil wells. Therefore, various modifications of this invention will now be apparent to one skilled in the art upon reading the specification, and it is intended to cover such modifications as fall within the scope of the appended claims.

I claim:

1. A flexible hose for carrying a fluid which is subjected to pressure surges comprising:
   a. an inner flexible non-expandable, high strength pressure conduit capable of carrying fluid under pressure;
   b. an annular resilient cushion body positioned around said inner flexible pressure conduit for absorbing undulations of said inner flexible pressure conduit in response to said pressure surges; and
   c. an outer flexible abrasion resistant tubular body encompassing said annular resilient cushion member.

2. The conduit of claim 1 wherein said annular resilient cushion member is made of closed cell foam rubber.

3. The flexible hose of claim 1 further comprising end fittings operatively connected to each end of said flexible hose for attachment to fluid delivery and receiving means.

4. A flexible hose assembly for carrying the fluid which is subjected to pressure surges comprising:
   a. an inner flexible non-expandable, high strength pressure conduit capable of carrying fluid under pressure;
   b. an annular resilient cushion body made of a closed cell foam rubber positioned around all except the end portions of said inner flexible pressure conduit for absorbing undulations of said inner flexible conduit in response to said pressure surges;
   c. an outer flexible abrasion resistant tubular body encompassing said annular resilient cushion body and the end portions of said inner flexible pressure conduit not encompassed by said annular resilient cushion body; and
   d. end fittings for connection with fluid delivery and receiving means operatively attached to the end portions of said inner flexible pressure conduit and said outer flexible abrasion-resistant tubular body.

* * * * *